(12) United States Patent
Malhotra et al.

(10) Patent No.: US 11,568,203 B2
(45) Date of Patent: Jan. 31, 2023

(54) FAILED AND CENSORED INSTANCES BASED REMAINING USEFUL LIFE (RUL) ESTIMATION OF ENTITIES

(71) Applicant: Tata Consultancy Services Limited, Mumbai (IN)

(72) Inventors: Pankaj Malhotra, Noida (IN); Vishnu Tv, Noida (IN); Lovekesh Vig, Gurgaon (IN); Gautam Shroff, Gurgaon (IN)

(73) Assignee: Tata Consultancy Services Limited, Mumbai (IN)

( * ) Notice: Subject to any disclaimer, the term of this patent is extended or adjusted under 35 U.S.C. 154(b) by 958 days.

(21) Appl. No.: 16/352,587

(22) Filed: Mar. 13, 2019

(65) Prior Publication Data

US 2020/0012921 A1  Jan. 9, 2020

(30) Foreign Application Priority Data

Jul. 9, 2018  (IN) .............................. 201821025626

(51) Int. Cl.
*G06N 3/04* (2006.01)
*G06N 3/08* (2006.01)
(Continued)

(52) U.S. Cl.
CPC ....... *G06N 3/0445* (2013.01); *G06F 11/2263* (2013.01); *G06N 3/08* (2013.01); *G06N 20/00* (2019.01)

(58) Field of Classification Search
CPC ..... G06N 3/0445; G06N 3/08; G06F 11/2263
See application file for complete search history.

(56) References Cited

U.S. PATENT DOCUMENTS 8,103,463 B2   1/2012  Kalgren et al.
8,712,726 B2   4/2014  Li et al.

OTHER PUBLICATIONS

Tian, Zhigang, Lorna Wong, and Nima Safaei. "A neural network approach for remaining useful life prediction utilizing both failure and suspension histories." Mechanical Systems and Signal Processing 24.5 (2010): 1542-1555. (Year: 2010).*

(Continued)

*Primary Examiner* — Michael J Huntley
*Assistant Examiner* — Sehwan Kim
(74) *Attorney, Agent, or Firm* — Finnegan, Henderson, Farabow, Garrett & Dunner, LLP

(57) ABSTRACT

Estimating Remaining Useful Life (RUL) from multi-sensor time series data is difficult through manual inspection. Current machine learning and data analytics methods, for RUL estimation require large number of failed instances for training, which are rarely available in practice, and these methods cannot use information from currently operational censored instances since their failure time is unknown. Embodiments of the present disclosure provide systems and methods for estimating RUL using time series data by implementing an LSTM-RNN based ordinal regression technique, wherein during training RUL value of failed instance(s) is encoded into a vector which is given as a target to the model. Unlike a failed instance, the exact RUL for a censored instance is unknown. For using the censored instances, target vectors are generated and the objective function is modified for training wherein the trained LSTM-RNN based ordinal regression is applied on an input test time series for RUL estimation.

9 Claims, 10 Drawing Sheets

(51) Int. Cl.
G06N 20/00 (2019.01)
G06F 11/22 (2006.01)

(56) References Cited

OTHER PUBLICATIONS

Heng, Aiwina Soong Yin. Intelligent prognostics of machinery health utilising suspended condition monitoring data. Diss. Queensland University of Technology, 2009. (Year: 2009).*

Hong, Yili, William Q. Meeker, and James D. McCalley. "Prediction of remaining life of power transformers based on left truncated and right censored lifetime data." The Annals of Applied Statistics (2009): 857-879. (Year: 2009).*

Li, Jianshu, et al. "Happiness level prediction with sequential inputs via multiple regressions." Proceedings of the 18th ACM International Conference on Multimodal Interaction. 2016. (Year: 2016).*

Falcaro, Milena, and Andrew Pickles. "A flexible model for multivariate interval-censored survival times with complex correlation structure." Statistics in medicine 26.3 (2007): 663-680. (Year: 2007).*

Martinsson, Egil. WTTE-RNN: Weibull Time to Event Recurrent Neural Network A model for sequential prediction of time-to-event in the case of discrete or continuous censored data, recurrent events or time-varying covariates. MS thesis. 2017. (Year: 2017).*

Niu, Zhenxing, et al. "Ordinal regression with multiple output cnn for age estimation." Proceedings of the IEEE conference on computer vision and pattern recognition. 2016. (Year: 2016).*

Liao, L. et al. (Sep. 2016). "Combining Deep Learning and Survival Analysis for Asset Health Management," located at http://www.phmsociety.org/sites/phmsociety.org/files/phm_submission/2016/ijphm_16_020.pdf; 7 pages.

Zheng, S. et al. "Long Short-Term Memory Network for Remaining Useful Life Estimation," *2017 IEEE International Conference on Prognostics and Health Management (ICPHM)*, Jun. 19-21, 2017, Dallas, TX; 8 pages.

* cited by examiner

Ordinal Regression For Censored Instances

FAILED AND CENSORED INSTANCES BASED REMAINING USEFUL LIFE (RUL) ESTIMATION OF ENTITIES

PRIORITY CLAIM

This U.S. patent application claims priority under 35 U.S.C. § 119 to: India Application No. 201821025626, filed in India on Jul. 9, 2018. The entire contents of the aforementioned application are incorporated herein by reference.

TECHNICAL FIELD

The disclosure herein generally relates to Remaining Useful Life (RUL) estimation, and, more particularly, to failed and censored instances based Remaining Useful Life estimation of entities using Long Short Term Memory-Recurrent Neural Networks (LSTM-RNN) based ordinal regression techniques and systems.

BACKGROUND

In the current Digital Era, streaming data is ubiquitous, and various original equipment manufacturers are taking a keen interest in Industrial Internet of Things-enabled remote health monitoring services to provide operational support, ensure high reliability and availability, and reduce operational cost of equipment. A large number of sensors are being installed to capture the operational behavior of equipment. Data-driven remaining useful life (RUL) estimation module is a key component of such health monitoring applications.

Recently, deep learning approaches have been proposed for various sensor data-driven health monitoring tasks including anomaly detection and prognostics, yielding state-of-the-art results for RUL estimation using Recurrent Neural Networks (RNNs). However, deep learning approaches for health monitoring have certain limitations. One such limitation is wherein Deep Neural Networks (DNN) require a large number of labeled training instances to avoid overfitting. However, such instances are often not available as failures are rare. If failure time for an instance is known, a target RUL can be obtained at any time before the failure time.

Deep RNNs and Convolutional Neural Networks (CNNs) have been proposed for RUL estimation. Most of these approaches consider RUL estimation to be a metric regression (MR) problem where a normalized estimate of RUL is obtained given time series of sensor data via a non-linear regression metric function learned from the data. It is noted that MR formulation of RUL estimation cannot directly leverage censored data typically encountered in RUL estimation scenarios and lead to inaccurate prediction of RUL.

SUMMARY

Embodiments of the present disclosure present technological improvements as solutions to one or more of the above-mentioned technical problems recognized by the inventors in conventional systems. For example, in one aspect, there is provided a processor implemented method for estimating remaining useful life of entities using associated failed and censored instances thereof. The method comprises: obtaining a first time series data and a second time series data pertaining to one or more entities, wherein the first time series data comprises time series data for one or more failed instances specific to one or more parameters associated with the entity, and wherein the second time series data comprises time series data for one or more censored instances specific to the one or more parameters associated with the one or more entities. In an embodiment, a first failed instance from the one or more failed instances is obtained from a first entity, and a second failed instance is obtained from a second entity that is different from the first entity. In an embodiment, a first censored instance from the one or more censored instances is obtained from a first entity, and a second censored instance is obtained from a second entity that is different from the first entity. In an example, the first entity may be a machine say M1, and the second entity may be another machine say M2. The method further includes determining (i) a Remaining Useful Life (RUL) for the one or more failed instances and (ii) at least a minimum RUL for the one or more censored instances; generating (i) a first set of binary labels using the absolute RUL for the one or more failed instances and (ii) a second set of binary labels using the at least a minimum RUL for the one or more censored instances respectively; and training, a Recurrent Neural Network (RNN) based Ordinal Regression Model (ORM) comprising one or more binary classifiers, using (i) the first set of binary labels and (ii) the second set of binary labels and associated label information thereof. In an embodiment, the one or more parameters are obtained from one or more sensors.

In an embodiment, the method may further comprise obtaining a time series data pertaining to one or more parameters of the one or more entities, wherein the time series data comprises one or more test instances; applying the trained RNN based ORM comprising the one or more trained binary classifiers on the time series data comprising the one or more test instances to obtain an estimate of target label for each trained binary classifier from the one or more trained binary classifiers, wherein an estimate of target vector is obtained using the estimate of target label obtained for each of the one or more trained binary classifiers; and generating, by using the estimate of target vector, a RUL estimate specific to the one or more test instances of the one or more entities.

In another aspect, there is provided a processor implemented system for estimating remaining useful life of entities using associated failed and censored instances thereof. The system comprises a memory storing instructions; one or more communication interfaces; and one or more hardware processors coupled to the memory via the one or more communication interfaces, wherein the one or more hardware processors are configured by the instructions to: obtain a first time series data and a second time series data pertaining to one or more entities, wherein the first time series data comprises time series data for one or more failed instances specific to one or more parameters associated with the one or more entities, and wherein the second time series data comprises time series data for one or more censored instances specific to the one or more parameters associated with the one or more entities; determine (i) a Remaining Useful Life (RUL) for the one or more failed instances and (ii) at least a minimum RUL for the one or more censored instances; generate (i) a first set of binary labels using the absolute RUL for the one or more failed instances and (ii) a second set of binary labels using the at least a minimum RUL for the one or more censored instances respectively; and train, a Recurrent Neural Network (RNN) based Ordinal Regression Model (ORM) comprising one or more binary classifiers, using (i) the first set of binary labels and (ii) the second set of binary labels and associated label information thereof. In an embodiment, the one or more parameters are obtained from one or more sensors.

In an embodiment, the one or more hardware processors are further configured by the instructions to: obtain a time series data pertaining to one or more parameters of the one or more entities, wherein the time series data comprises one or more test instances; apply the trained RNN based ORM comprising the one or more trained binary classifiers on the time series data comprising the one or more test instances to obtain an estimate of target label for each trained binary classifier from the one or more trained binary classifiers, wherein an estimate of target vector is obtained using the estimate of target label obtained for each of the one or more trained binary classifiers; and generating, by using the estimate of target vector, a RUL estimate specific to the one or more test instances of the one or more entities.

In yet another aspect, there are provided one or more non-transitory machine readable information storage mediums comprising one or more instructions which when executed by one or more hardware processors causes estimating remaining useful life of entities using associated failed and censored instances thereof by obtaining a first time series data and a second time series data pertaining to one or more entities, wherein the first time series data comprises time series data for one or more failed instances specific to one or more parameters associated with the one or more entities, and wherein the second time series data comprises time series data for one or more censored instances specific to the one or more parameters associated with the one or more entities; determining (i) a Remaining Useful Life (RUL) for the one or more failed instances and (ii) at least a minimum RUL for the one or more censored instances; generating (i) a first set of binary labels using the RUL for the one or more failed instances and (ii) a second set of binary labels using the at least a minimum RUL for the one or more censored instances respectively; and training, a Recurrent Neural Network (RNN) based Ordinal Regression Model (ORM) comprising one or more binary classifiers, using (i) the first set of binary labels and (ii) the second set of binary labels and associated label information thereof. In an embodiment, the one or more parameters are obtained from one or more sensors.

In an embodiment, the instructions which when executed by the one or more hardware processor may further cause obtaining a time series data pertaining to one or more parameters of the one or more entities, wherein the time series data comprises one or more test instances; applying the trained RNN based ORM comprising the one or more trained binary classifiers on the time series data comprising the one or more test instances to obtain an estimate of target label for each trained binary classifier from the one or more trained binary classifiers, wherein an estimate of target vector is obtained using the estimate of target label obtained for each of the one or more trained binary classifiers; and generating, by using the estimate of target vector, a RUL estimate specific to the one or more test instances of the one or more entities.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
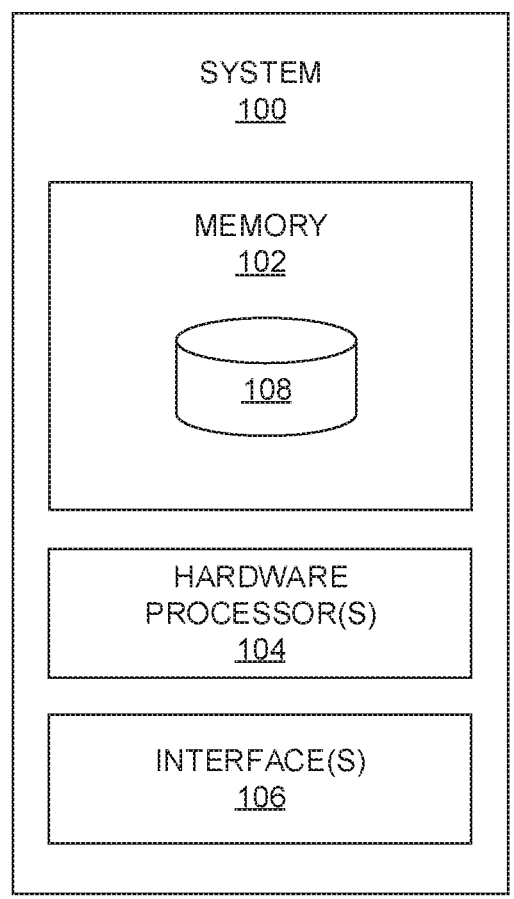
FIG. 1 illustrates an exemplary block diagram of a system for estimating Remaining Useful Life (RUL) of entities using associated failed and censored instances of parameters in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Estimating remaining useful life (RUL) for equipment using sensor data streams is useful to enable condition based maintenance, and avoid catastrophic shutdowns due to impending failures. As discussed above, supervised deep learning approaches have been proposed for RUL estimation that leverage historical sensor data of failed instances for training the models. However, access to a large number of failed instances required to train deep networks is often rare in real-world scenarios. On the other hand, data from a large number of currently operational instances is easily accessible but deemed unusable for training due to obvious lack of target (RUL) labels for these instances. In the present disclosure, Long Short Term Memory-Recurrent Neural Networks (LSTM-RNN) based ordinal regression techniques and systems is proposed to leverage these operational instances while training deep Recurrent Neural Networks (RNNs) for RUL estimation from time series of sensor data.

The present disclosure formulates RUL estimation as an ordinal regression (OR) problem, and employs deep RNNs to learn the OR function. The experimental results conducted by the present disclosure show that OR-based formulation of the RUL estimation problem naturally allows incorporating the censored operational instances into training data, leading to more robust learning. Through experiments on C-MAPSS turbofan engine benchmark datasets, the present disclosure demonstrates that the proposed technique performs better than the commonly used deep metric regression based approaches, especially when failed training instances are scarce.

More specifically, the proposed LSTM-OR leverages the advantages of deep learning to learn non-linear mapping from time series of raw sensor data to RUL, and uses censored data to overcome small labeled data issues arising due to limited failure instances.

An important class of approaches for RUL estimation is based on trajectory similarity. These approaches compare the health index trajectory or trend of a test instance with the trajectories of failed train instances to estimate RUL using a distance metric such as Euclidean distance. Such approaches work well when trajectories are smooth and monotonic in nature but are likely to fail in scenarios when there is noise or intermittent disturbances (e.g. spikes, operating mode change, etc.) as the distance metric may not be robust to such scenarios. Another class of approaches is based on metric regression as discussed above. Unlike trajectory similarity based methods which rely on comparison of trends, metric regression methods attempt to learn a function to directly map sensor data to RUL. Such methods can better deal with non-monotonic and noisy scenarios by learning to focus on the relevant underlying trends irrespective of noise. Within metric regression methods, few methods consider non-temporal models such as Support Vector Regression for learning the mapping from values of sensors at a given time instance to RUL.

Deep temporal models such as those based on RNNs or Convolutional Neural Networks (CNNs) can capture the degradation trends better compared to non-temporal models, and are proven to perform better. Moreover, these models can be trained in an end-to-end learning manner without requiring feature engineering. Despite all these advantages of deep models, they are prone to overfitting in often-encountered practical scenarios where the number of failed instances is small, and most of the data is censored. The proposed approach by the present disclosure is based on ordinal regression provisions for dealing with such scenarios, by using censored instances in addition to failed instances to obtain more robust models.

A set of techniques for deep survival analysis have been proposed in medical domain. On similar lines, an approach to combine deep learning and survival analysis for asset health management has been proposed in the past. However, it is not clear as to how such approaches can be adapted for RUL estimation applications, as they focus on estimating the survival probability at a given point in time and/or assume a distribution (such as Weibull distribution) on the survival time, and cannot provide RUL estimates. On the other hand, LSTM-OR is capable of providing RUL estimates using time series of sensor data without making any such assumptions. In this context, the embodiments of the present disclosure propose LSTM-OR for deep ordinal regression from time series data with application to RUL estimation. To address the aforementioned issue of scarce labeled training data, the present disclosure proposes an approach to generate partially labeled training instances from the readily available operational (non-failed) instances to augment the labeled training data, yielding robust RUL estimation models.

Referring now to the drawings, and more particularly to FIGS. 1 through 6D, where similar reference characters denote corresponding features consistently throughout the figures, there are shown preferred embodiments and these embodiments are described in the context of the following exemplary system and/or method.

FIG. 1 illustrates an exemplary block diagram of a system 100 for estimating Remaining Useful Life of entities using associated failed and censored instances of parameters in accordance with an embodiment of the present disclosure. In an embodiment, the system 100 may also be referred as 'a RUL system', and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, a plurality of parameters obtained from one or more sensors, wherein the parameters are specific to one or more entities (e.g., user, machine, and the like). Parameters may comprise sensor data captured through the sensors either connected to the user and/or machine. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2:
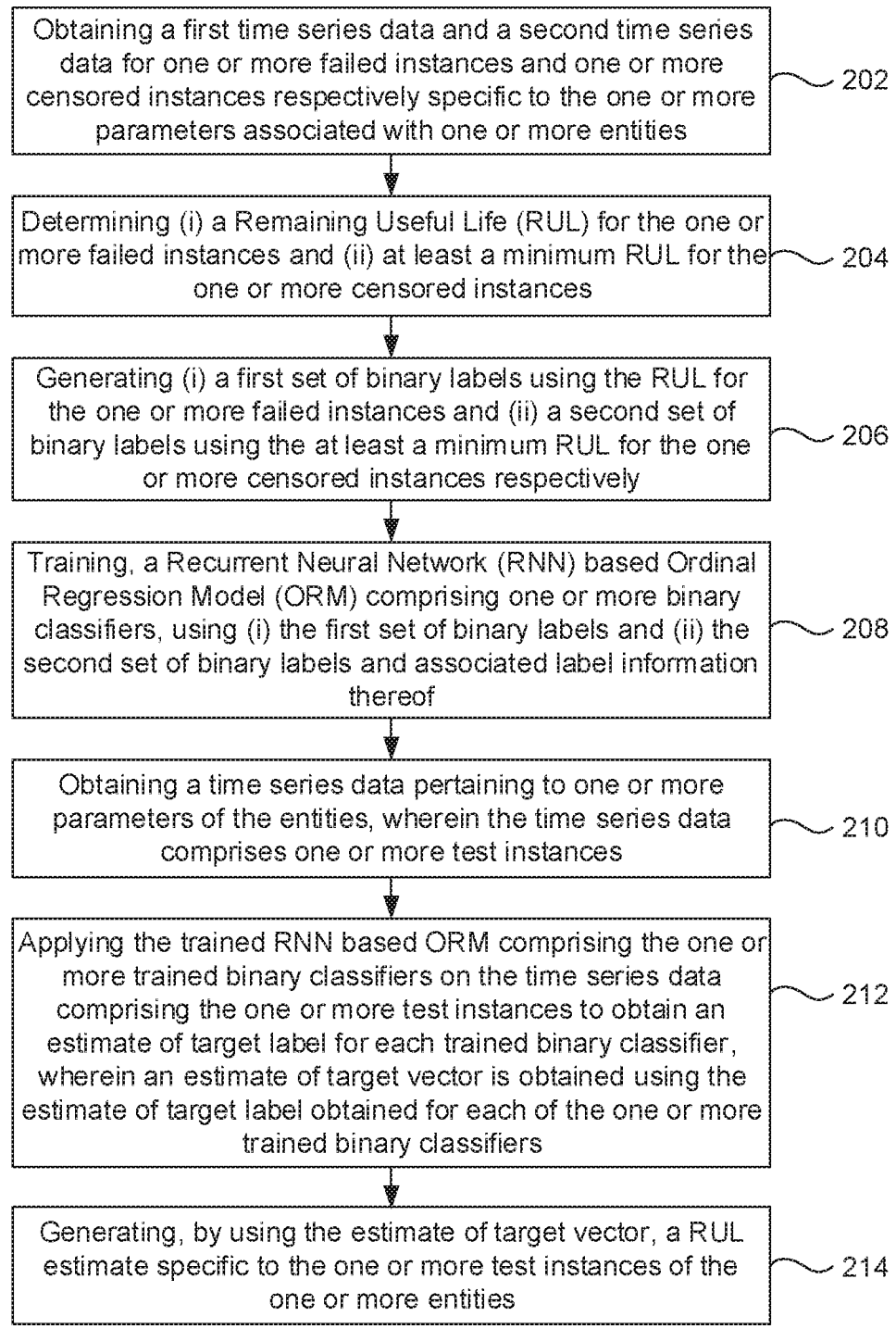
FIG. 2 illustrates an exemplary flow diagram illustrating a method for estimating Remaining Useful Life (RUL) of entities using associated failed and censored instances of parameters using the system of FIG. 1 according to an embodiment of the present disclosure.

FIG. 2, with reference to FIG. 1, illustrates an exemplary flow diagram illustrating a method for estimating Remaining Useful Life of entities using associated failed and censored instances of parameters using the system 100 of FIG. 1 according to an embodiment of the present disclosure. In an embodiment, the system 100 comprises one or more data storage devices or the memory 102 operatively coupled to the one or more hardware processors 104 and is configured to store instructions for execution of steps of the method by the one or more processors 104.

The present disclosure uses a variant of Long Short Term Memory (LSTMs) as described in conventional systems/methods (e.g., refer 'Wojciech Zaremba, Ilya Sutskever, and Oriol Vinyals. 2014—Recurrent neural network regularization, arXiv preprintarXiv:1409.2329 (2014)') in the hidden layers of a neural network system (e.g., the system 100). In an embodiment the system 100 may also be referred as 'Deep Long Short Term Memory (LSTM) Recurrent Neural Networks (RNNs) system' for Ordinal Regression (OR), and can be interchangeably used herein after. In the present disclosure, column vectors may be denoted as 'bold small vectors' and matrices by 'bold capital letters' respectively. For a hidden layer with h LSTM units, values for an input gate $i_t$, forget gate $f_t$, output gate $o_t$, hidden state $z_t$, and cell state $c_t$ at time t are computed using current input $x_t$, a previous hidden state $z_{t-1}$, and cell state $c_{t-1}$, where $i_t$, $f_t$, $o_t$, $z_t$, and $c_t$ are real-valued h-dimensional vectors.

The present disclosure considers $W_{n_1,n_2}: \mathbb{R}^{n_1} \to \mathbb{R}^{n_2}$ to be an affine transform of the form $z \mapsto Wz+b$ for matrix W and vector b of appropriate dimensions. In the case of a multi-layered LSTM network with L layers and h LSTM units in each layer, the hidden state $z_t^l$ at time t for the l-th hidden layer is obtained from the hidden state at t−1 for that layer $z_{t-1}^l$ and the hidden state at t for the previous (l−1)-th hidden layer $z_t^{l-1}$. The time series goes through the following transformations iteratively at l-th hidden layer for t=1 through T, where T is length of the time series:

$$\begin{pmatrix} i_t^l \\ f_t^l \\ o_t^l \\ g_t^l \end{pmatrix} = \begin{pmatrix} \sigma \\ \sigma \\ \sigma \\ \tanh \end{pmatrix} W_{2h,4h} \begin{pmatrix} D(Z_t^{l-1}) \\ Z_{t-1}^l \end{pmatrix} \quad (1)$$

where cell state $c_t^l$ is given by $c_t^l = f_t^l c_{t-1}^l + i_t^l g_t^l$, and the hidden state $z_t^l$ is given by $z_t^l = o_t^l \tanh(c_t^l)$. Dropout is used for regularization (e.g., refer 'Vu Pham, Th'eodore Bluche, Christopher Kermorvant, and Jerome Louradour. 2014. Dropout improves recurrent neural networks for handwriting recognition. In Frontiers in Handwriting Recognition (ICFHR). IEEE, 285-290.'), which is applied only to non-recurrent connections, ensuring information flow across time-steps for any LSTM unit. The dropout operator D(.) randomly sets dimensions of its argument to zero with probability equal to a dropout rate. The sigmoid ($\sigma$) and (tan h) activation functions are applied element-wise.

In a nutshell, this series of transformation for t=1, T, converts the input time series $x=x_1, \ldots x_T$ of length T to a fixed dimensional vector $z_T^L \in \mathbb{R}^h$. The present disclosure (or the system 100) therefore represents the LSTM network by a function $f_{LSTM}$ such that $z_T^L = f_{LSTM}(x;W)$, where W represents all parameters of the LSTM network.

Consider a learning set $\mathcal{D} = \{x^i, r^i\}_{i=1}^n$ of n failed instances, where $r^i$ is the target RUL, $x^i = x_1^i, \ldots x_{T^i}^i \in \chi$ is a multivariate time series of length $T^i$, $x_t^i \in \mathbb{R}^p$, p is the number of input parameters (sensors or sensor data). The total operational life of an instance i till the failure point is $F^i$, such that $T^i \le F^i$. Therefore, $r^i = F^i - T^i$ is the RUL in given unit of measurement, e.g., number of cycles or operational hour(s). For the sake of brevity, superscript i may be omitted for providing formulation considering an instance (unless stated otherwise).

Figure 3A:
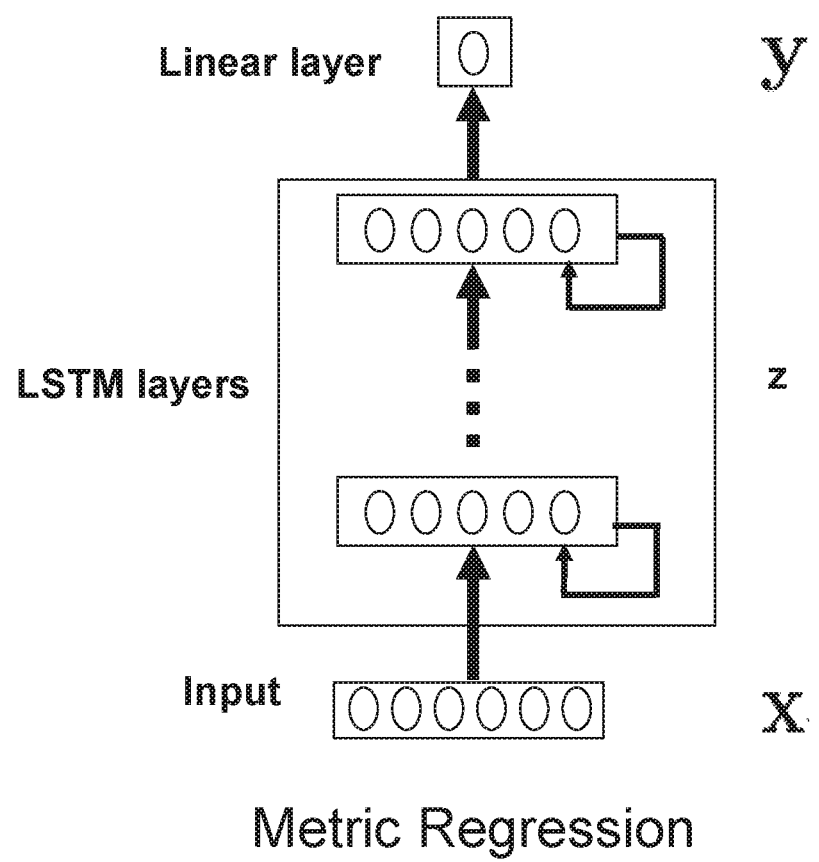
FIG. 3A depicts an exemplary conventional Deep Metric Regression (Deep MR) method/technique.
Figure 3B:
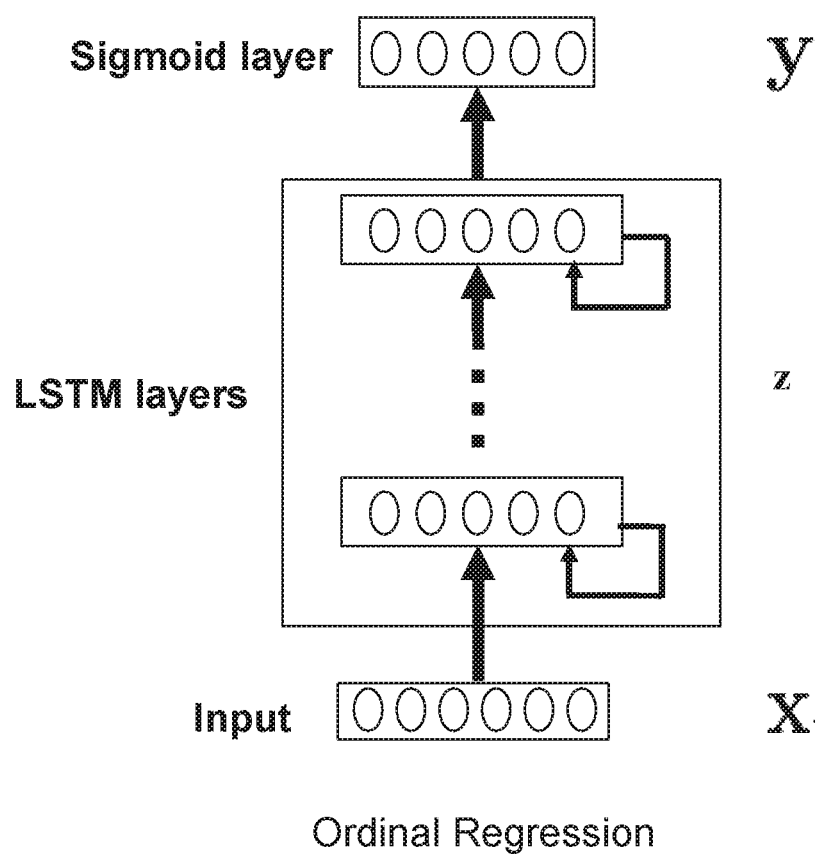
FIG. 3B depicts an exemplary Ordinal Regression for failed instances as implemented by the system of FIG. 1 in accordance with an embodiment of the present disclosure.
Figure 3C:
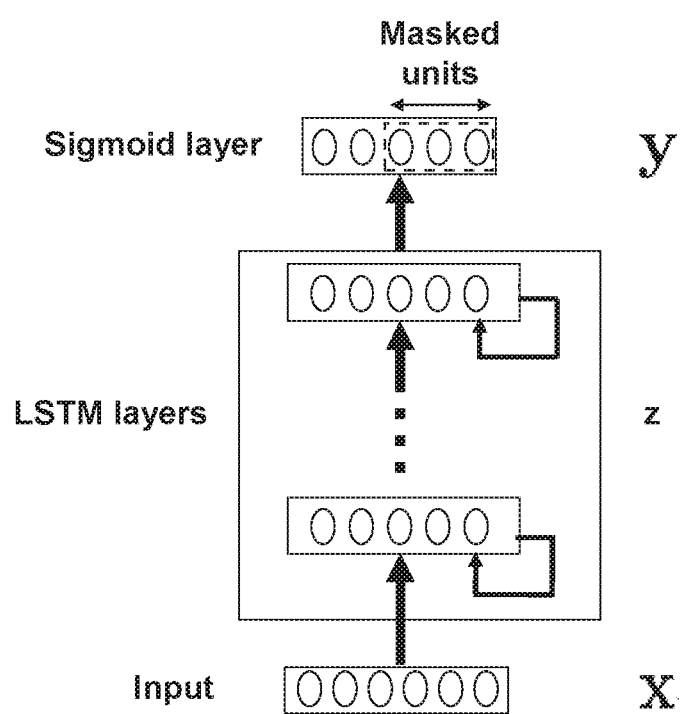
FIG. 3C depicts an exemplary Ordinal Regression for censored instances as implemented by the system of FIG. 1 in accordance with an embodiment of the present disclosure.
Figure 5:
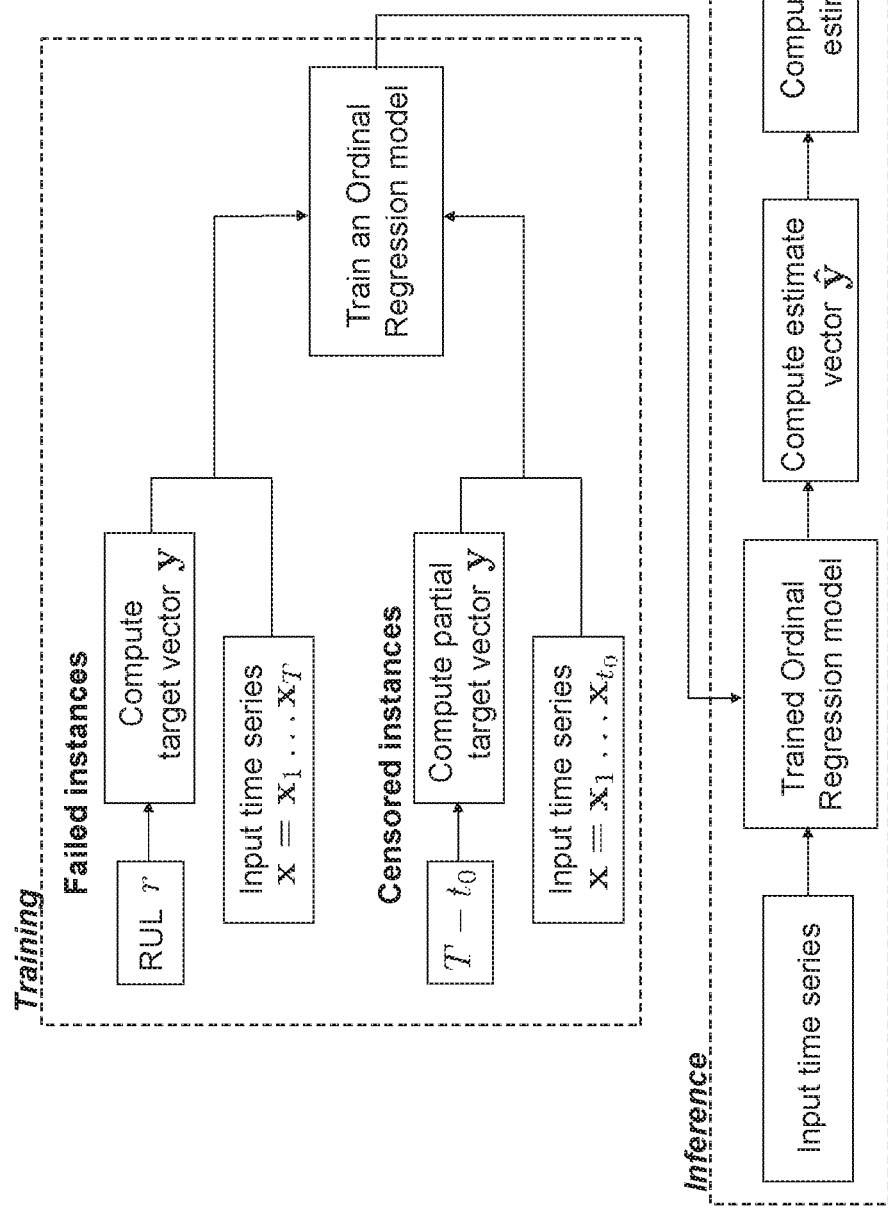
FIG. 5 depicts an exemplary block diagram illustrating a flow diagram for Long Short Term Memory-Ordinal Regression (LSTM-OR) technique implemented by the system of FIG. 1 for estimating RUL of entities using associated failed and censored instances thereof in accordance with an example embodiment of the present disclosure.
Figure 6A:
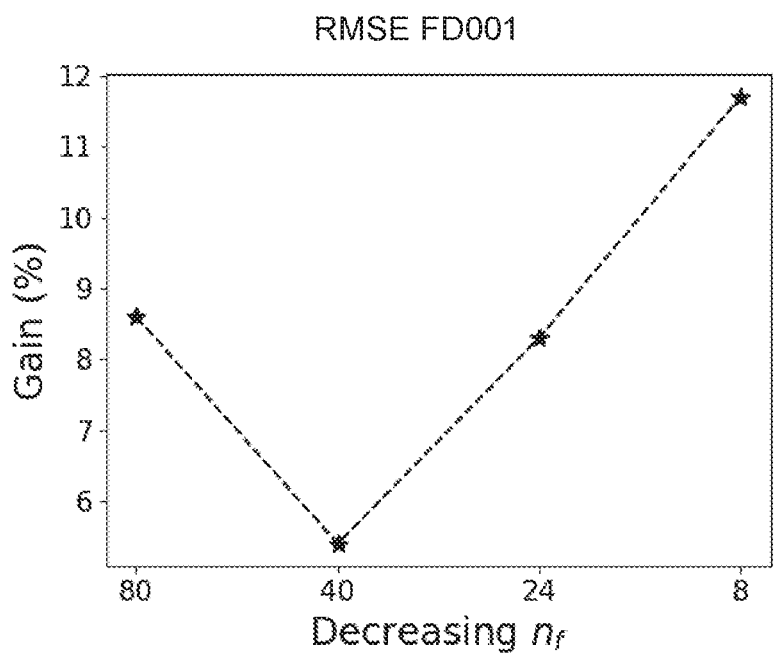
FIGS. 6A through 6D depict graphical representations illustrating percentage gain of ORC (LSTM-OR leveraging censored data along with failed instances using loss function) over Metric Regression (MR) technique with decreasing number of failed instances ($n_f$) in training in accordance with an embodiment of the present disclosure.
Figure 6B:
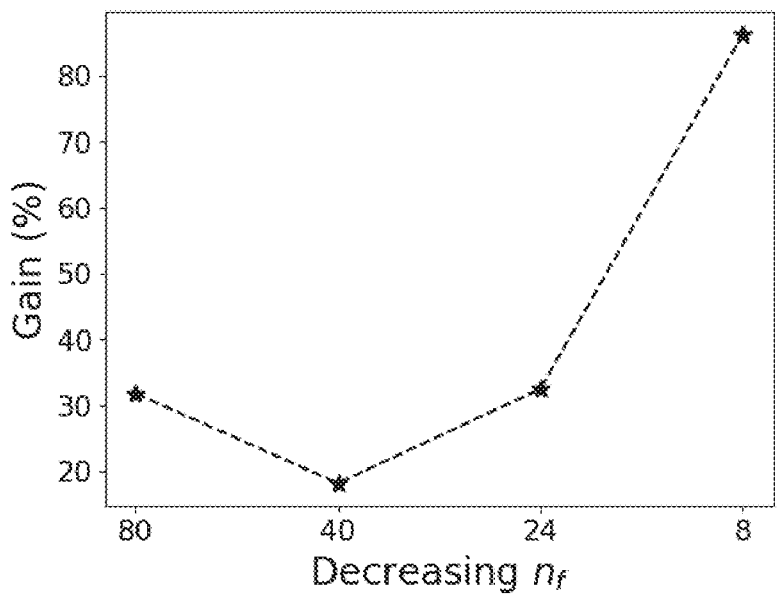
Figure 6C:
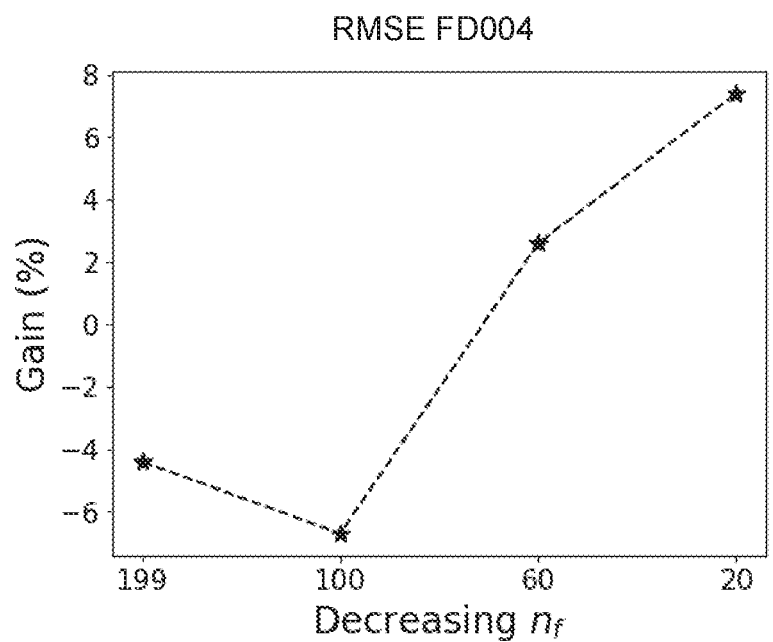
Figure 6D:
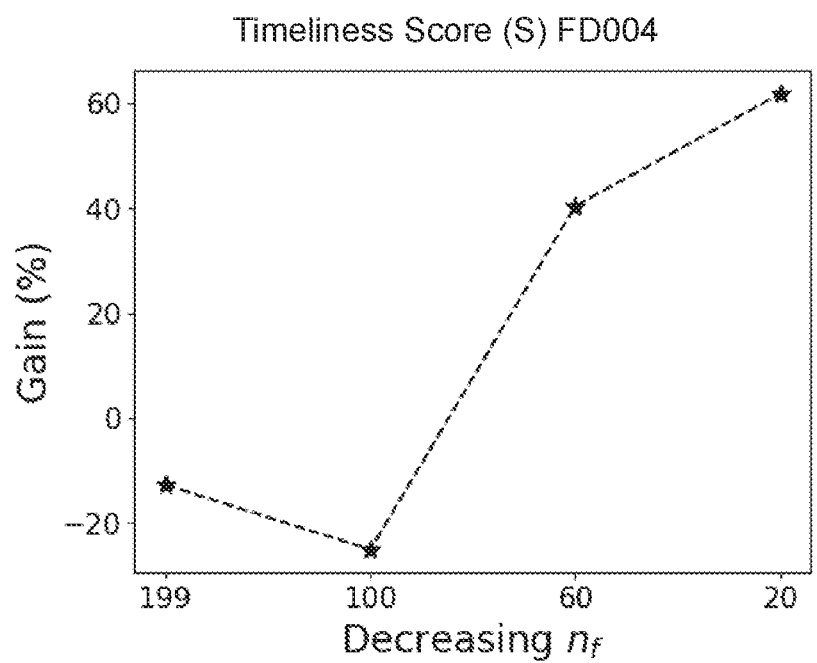

The present disclosure (and/or system 100) considers an upper bound say $r_u$ on possible values of RUL as, in practice, it is not possible to predict too far ahead in future. When $r > r_u$, value of r is clipped to $r_u$. The usually defined goal of RUL estimation via Metric Regression (MR) is to learn a mapping $f_{MR}: \chi \to [0, r_u]$. FIG. 3A, with reference to FIGS. 1-2 depicts an exemplary conventional Deep Metric Regression method. FIG. 3B, with reference to FIGS. 1 through 3A, depicts an exemplary Ordinal Regression for failed instances as implemented by the system 100 of FIG. 1 in accordance with an embodiment of the present disclosure. FIG. 3C, with reference to FIGS. 1 through 3B, depicts an exemplary Ordinal Regression for censored instances as implemented by the system 100 of FIG. 1 in accordance with an embodiment of the present disclosure. Keeping the above in mind, the present disclosure describes LSTM based Ordinal Regression (LSTM-OR) approach as depicted in FIG. 5.

In the present disclosure, instead of mapping an input time series to a real-valued number as in convention method (e.g., MR) depicted in FIG. 3A, the system 100 breaks (or splits) the range $[0, r_u]$ of RUL values into K intervals of length c each, where each interval is then considered as a discrete variable. The j-th interval corresponds to $$\left((j-1)\frac{r_u}{c}, j\frac{r_u}{c}\right],$$

and r is mapped to the k-th interval with $$k = \left\lceil \frac{r}{c} \right\rceil,$$

where $\lceil . \rceil$ denotes ceiling function.

The system 100 considers K binary classification sub-problems for the K discrete variables (intervals): a classifier $C_j$ solves the binary classification problem of determining whether $$r \le j\frac{r_u}{c}.$$

The system 100 trains a LSTM network for the K binary classification tasks simultaneously by modeling them together as a multi-label classification problem. Multi-label target vector is obtained by way of following example expression: $y = [y_1, \ldots y_K] \in \{0,1\}^K$ from r such that:

$$y_j = \begin{cases} 0 & j < k \\ 1 & j \ge k \end{cases} \quad (2)$$

where j=1, 2, ..., K.

Figure 4A:
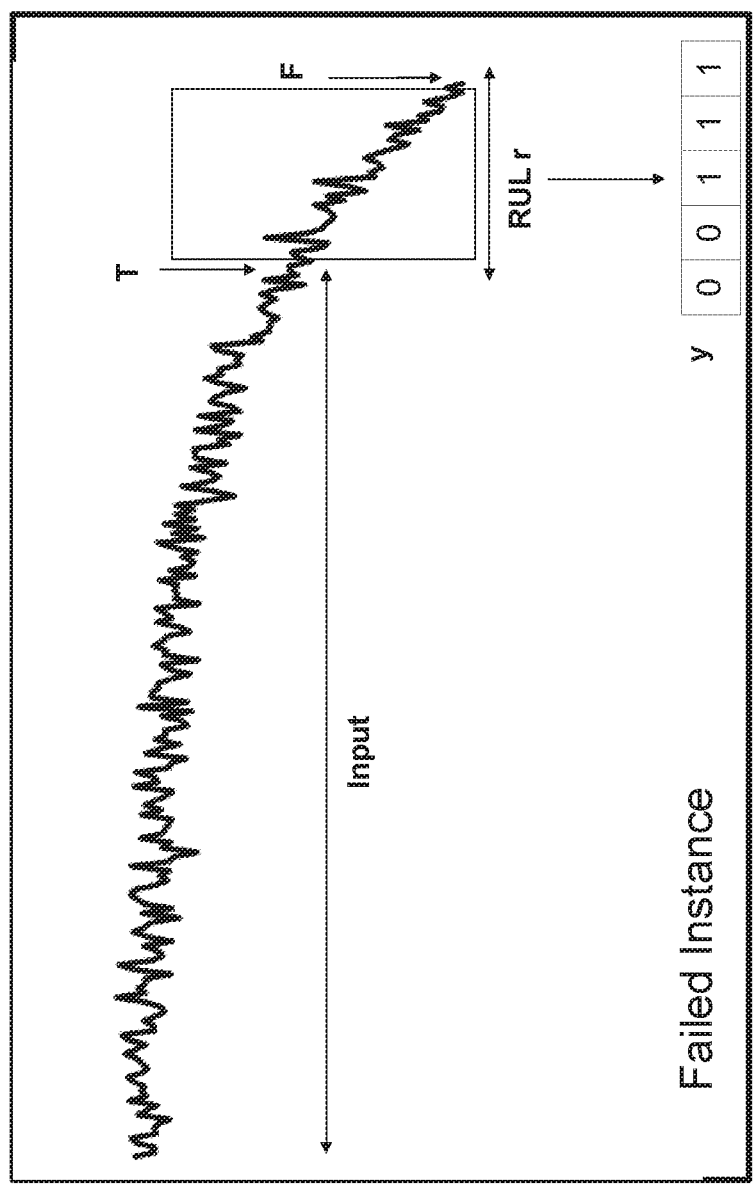
FIGS. 4A-4B depict target vector creation for failed versus censored instances by the system of FIG. 1 in accordance with an embodiment of the present disclosure.
Figure 4B:
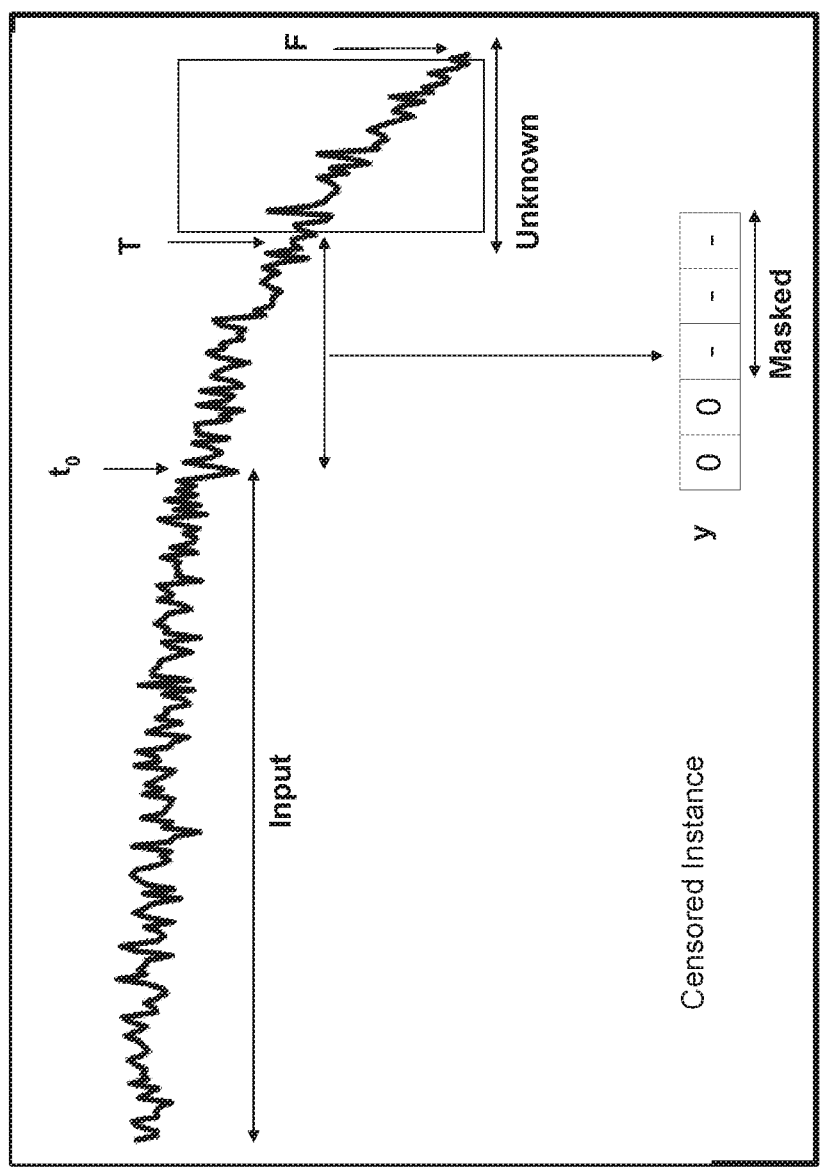

For example, consider a scenario where K=5, and r maps to the third interval such that k=3. The target is then given by y=[0, 0, 1, 1, 1], as illustrated in FIG. 4A. More specifically, FIGS. 4A-4B depict target vector creation for failed versus censored instances by the system 100 of FIG. 1 in accordance with an embodiment of the present disclosure. Effectively, the goal of LSTM-OR is to learn a mapping $f_{OR}: \chi \to \{0,1\}^K$ by minimizing the loss function £ given by:

$$z_T^l = f_{LSTM}(x; W) \quad (3)$$

$$\hat{y} = \sigma(W_c z_T^l + b_c)$$

$$\mathcal{L}(y, \hat{y}) = -\frac{1}{K} \sum_{j=1}^{K} y_j \cdot \log(\hat{y}_j) + (1 - y_j) \cdot \log(1 - \hat{y}_j)$$

where $\hat{y}$ is the estimate for target y, W represents the parameters of the LSTM network, and $W_c$ and $b_c$ are parameters of the layer that maps $z_T^l$ to the output sigmoid layer.

For any censored instance, data is available only till a time T prior to failure and the failure time F is unknown (e.g., refer FIG. 4B). Therefore, the target RUL r is also unknown. However, at any time $t_0$ such that (also referred as s.t.) $1 \le t_0 \le T$, it is known that the RUL $r > T - t_0$ since the instance is operational at least till T. Considering $x = x_1, \ldots x_{t_0}$ as the input time series, the present disclosures shows how labels are assigned to few of the dimensions $y_j$ of the target vector y. Assuming $T - t_0$ maps to the interval $$k' = \left\lceil \frac{T - t_0}{c} \right\rceil, \text{ since } T - t_0 < r, \left\lceil \frac{T - t_0}{c} \right\rceil < \left\lceil \frac{r}{c} \right\rceil \Rightarrow k' \le k.$$

Since k is unknown (as r is unknown), and $k' \le k$, the target vector y can only be partially obtained as following by way of example expression below:

$$y_j = \begin{cases} 0 & j < k' \\ \text{unknown} & j \ge k' \end{cases} \quad (4)$$

For all $j \ge k'$, the corresponding binary classifier targets are masked, as shown in FIG. 4B, and the outputs from these classifiers are not included in the loss functions for the instance(s). The loss function L given by equation (3) can thus be modified for including the censored instances in training as:

$$\mathcal{L}_m(y, \hat{y}) = -\frac{1}{K'} \sum_{j=1}^{K'} y_j \cdot \log(\hat{y}_j) + (1 - y_j) \cdot \log(1 - \hat{y}_j) \quad (5)$$

where $K' = k' - 1$ for a censored instances and $K' = K$ for a failed instance.

Once trained, each of the K classifiers provide a probability $\hat{y}_j$ for RUL being greater than the upper limit of the interval corresponding to the j-th classifier. Point-estimate $\hat{r}$ for r from $\hat{y}$ for a test instance is obtained as follows:

$$\hat{r} = r_u \left( 1 - \frac{1}{K} \sum_{j=1}^{K} \hat{y}_j \right) \quad (6)$$

It is worth noting that once the system 100 (or classifier is learned), the LSTM-OR model can be used in an online manner for operational instances: at current time instance t, the sensor data from the latest T time instances can be input to the model to obtain the RUL estimate r at t.

The steps of the method of the present disclosure will now be explained with reference to the components of the system 100 as depicted in FIG. 1, the flow diagram of FIG. 2, FIGS. 3B-3C, FIGS. 4A-4B, FIG. 5, and above description (e.g., refer paragraphs [027] till [037]) respectively. In an embodiment of the present disclosure, at step 202, the one or more hardware processors 104 obtain a first time series data and a second time series data pertaining to one or more entities, wherein the first time series data comprises time series data for one or more failed instances specific to one or more parameters associated with the one or more entities, and wherein the second time series data comprises time series data for one or more censored instances specific to the one or more parameters associated with the one or more entities. The failed instances and the censored instances are depicted by way of examples in FIGS. 4A and 4B respectively for vector creation. In an embodiment, the one or more parameters are obtained from one or more sensors (e.g., motion sensors, health monitoring sensors, and the like associated with the entities say user or a machine/device). In an embodiment, a first failed instance from the one or more failed instances is obtained from a first entity, and a second failed instance is obtained from a second entity that is different from the first entity. In an embodiment, a first censored instance from the one or more censored instances is obtained from a first entity, and a second censored instance is obtained from a second entity that is different from the first entity. In an example, the first entity may be a machine say M1, and the second entity may be another machine say M2. Similarly, a first failed instance from the one or more failed instances is obtained from a first entity (e.g., say user 1), and a second failed instance is obtained from a second entity (e.g., say user 2) that is different from the first entity. In an embodiment, a first censored instance from the one or more censored instances is obtained from a first entity (e.g., say user 1), and a second censored instance is obtained from a second entity (e.g., say user 2) that is different from the first entity.

In an embodiment of the present disclosure, at step 204, the one or more hardware processors 104 determine (i) a Remaining Useful Life (RUL) for the one or more failed instances and (ii) at least a minimum RUL for the one or more censored instances.

In an embodiment of the present disclosure, at step 206, the one or more hardware processors 104 generate (i) a first set of binary labels using the RUL for the one or more failed instances and (ii) a second set of binary labels using the at least a minimum RUL for the one or more censored instances respectively.

In an embodiment of the present disclosure, at step 208, the one or more hardware processors 104 training, a Recurrent Neural Network (RNN) based Ordinal Regression Model (ORM) comprising one or more binary classifiers, using (i) the first set of binary labels and (ii) the second set of binary labels and associated label information thereof. The training phase (blocks of training phase depicted in FIG. 5 are mapped to corresponding steps (202) till (208) of FIG. 2) is depicted in upper portion of FIG. 5. During a testing phase (or inference phase—refer bottom portion of FIG. 5 wherein (blocks of testing or inference phase depicted in FIG. 5 are mapped to corresponding steps (210) till (214) of FIG. 2)), a test data comprising a time series data pertaining to one or more parameters of the entities is obtained at step 210 via the one or more hardware processors 104. More specifically, FIG. 5, with reference to FIGS. 1 through 4B, depicts an exemplary block diagram illustrating a flow diagram for Long Short Term Memory Ordinal Regression technique implemented by the system 100 of FIG. 1 for estimating RUL of entities using associated failed and censored instances thereof in accordance with an example embodiment of the present disclosure. The input test data in this case comprises of one or more test instances. In an embodiment of the present disclosure, at step 212, the one or more hardware processors 104 invoke and/or execute the trained RNN based OR model comprising the one or more trained binary classifiers (e.g., also referred as 'K classifiers') which get applied on the time series data comprising the one or more test instances as a result an estimate of target label is obtained for each trained binary classifier. The estimate of target label of each of the one or more trained binary classifiers is then used to obtain an estimate of target vector, wherein the estimate of target vector is used to generate a RUL estimate specific to the one or more test instances of the one or more entities as depicted in step 214 of FIG. 2. In one embodiment, there can be multiple estimates of target label for each test instance, in one embodiment. In an embodiment, the estimate of target vector is obtained using the estimate of target label obtained for each of the one or more trained binary classifiers.

Experimental Evaluation:

The present disclosure considered three approaches for evaluation: i) MR: LSTM-MR using failed instances only, ii) OR: LSTM-OR using failed instances only and using loss as in Equation (3), iii) ORC: LSTM-OR leveraging censored data (or censored instances) along with failed instances using loss as in Equation (5). Publicly available C-MAPSS aircraft turbofan engine benchmark datasets (e.g., refer 'A Saxena and K Goebel. 2008. Turbofan Engine Degradation Simulation Data Set. NASA Ames Prognostics Data Repository (2008).') for experiments by the present disclosure and systems and methods associated thereof.

Dataset Description:

The present disclosure considered datasets FD001 and FD004 from the simulated turbofan engine datasets (e.g., refer '1https://ti.arc.nasa.gov/tech/dash/groups/pcoe/prognostic-data-repository/#turbofan' and 'A Saxena and K Goebel. 2008. Turbofan Engine Degradation Simulation Data Set. NASA Ames Prognostics Data Repository (2008)'). The training sets (train_FD001 and train_FD004) of the two datasets contain time series of readings for 24 sensors (21 sensors and 3 operating condition variables) of several instances (100 in FD001 and 249 in FD004) of a turbofan engine from the beginning of usage till end of life. The time series for the instances in the test sets (test_FD001 and test_FD004) were pruned some time prior to failure, such that the instances are operational and their RUL needs to be estimated. 20% of the available training set instances were randomly sampled, as given in below Table 1, to create a validation set for hyperparameter selection.

TABLE 1

| Dataset | Train | Validation | Test | OC | FM |
|---------|-------|------------|------|----|----|
| FD001   | 80    | 20         | 100  | 1  | 1  |
| FD004   | 199   | 50         | 248  | 6  | 2  |

Table 1 depicts Number of train, validation and test instances, wherein OC: number of operating conditions, and FM: number of fault modes.

For simulating the scenario for censored instances, a percentage m∈{0, 50, 70, 90} of the training and validation instances were randomly chosen, and time series for each instance was randomly truncated at one point prior to failure. These truncated instances were then considered as censored (currently operational) and their actual RUL values as unknown. The remaining (100−m %) of the instances were considered as failed. Further, the time series of each instance thus obtained (censored and failed) was truncated at 20 random points in the life prior to failure, and the exact RUL r for failed instances and the minimum possible RUL T−$t_0$ for the censored instances (as described in paragraphs [027] till [037] and FIGS. 4A-4B) at the truncated points were used for obtaining the models. The number of instances thus obtained for training and validation for m=0 is given in below exemplary Table 2.

TABLE 2

| Dataset | Train | Validation | Test |
|---------|-------|------------|------|
| FD001   | 1600  | 400        | 100  |
| FD004   | 3980  | 1000       | 248  |

As depicted in above tables (Table 1 and Table 2) the test set remains the same as the benchmark dataset across all scenarios (with no censored instances). The MR and OR approaches cannot utilize the censored instances as the exact RUL targets were unknown, while ORC can utilize the lower bound on RUL targets to obtain partial labels as per Equation (4).

An engine may operate in different operating conditions and also have different failure modes at the end of its life. The number of operating conditions and failure modes for both the datasets are given in the Table 1. FD001 had only one operating condition, corresponding three sensors were ignored such that p=21, whereas FD004 had six operating conditions determined by the three operating condition variables. These six operating conditions were mapped to a 6-dimensional one hot vector (not shown in FIGS), such that p=27.

Performance Metrics:

The present disclosure measures the performance of the proposed models in terms of Timeliness Score (S) and Root Mean Squared Error (RMSE). For a test instance say i, error in estimation is given by $e_i=\hat{r}_i-r_1$. The timeliness score for N test instances is given by: $S=\Sigma_{i=1}^{N}(\exp(\gamma \cdot |e_i|)-1)$, where $\gamma=1/\tau_1$ if $e_i<0$, else $\gamma=1/\tau_2$. Usually, $\tau_1>\tau_2$ such that late predictions are penalized more compared to early predictions. $\tau_1=13$ and $\tau_2=10$ values were used by the system 100. The lower the value of S, the better is the performance. The root mean squared error (RMSE) is given by:

$$RMSE = \sqrt{\frac{1}{N}\sum_{i=1}^{N} e_i^2}.$$

Experimental Setup:

The present disclosure and systems and methods associated thereof considered $r_u=130$ cycles for all models. For OR and ORC, The present disclosure and systems and methods associated thereof consider K=10 such that interval length c=13. For training the MR models, a normalized RUL in the range 0 to 1 (where 1 corresponds to a target RUL of 130 or more) was given as the target for each input. A maximum time series length of T=360 was used; and for any instance with more than 360 cycles, most recent 360 cycles were taken. The present disclosure further utilized standard z-normalization to normalize the input time series sensor wise using mean and standard deviation of each sensor from the train set.

The hyper parameters h (number of hidden units per layer), L (number of hidden layers) and the learning rate were chosen from the sets {50, 60, 70, 80, 90, 100}, {2, 3}, and {0.001, 0.005}, respectively. A dropout rate of 0.2 was used for regularization, and a batch size of 32 during training respectively. The models were trained for a maximum of 2000 iterations with early stopping. The best hyper parameters were obtained using grid search by minimizing the respective loss function on the validation set.

It was observed that as the number of failed training instances ($n_f$) decreases, the performance for all models degrades (as expected) (refer Table 3A and 3B below). However, importantly, for scenarios with small $n_f$, ORC was significantly better than MR and OR. For example, with m=90% (i.e. with $n_f$=8 and 20 for FD001 and FD004, respectively), ORC performs significantly better than MR, and shows 11.6% and 7.4% improvement over MR in terms of RMSE, for FD001 and FD004, respectively. The gains in terms of timeliness score S are further higher because of the exponential nature of S (refer paragraph [051]—performance metrics). This is further evident with increasing percentage gain of ORC over MR with decreasing number of failed instances in training, as shown in FIGS. 6A through 6D. More specifically, FIGS. 6A through 6D, with reference to FIGS. 1 to 5, depict graphical representations illustrating percentage gain of ORC (LSTM-OR leveraging censored data along with failed instances using loss function) over MR with decreasing number of failed instances ($n_f$) in training in accordance with an embodiment of the present disclosure. While MR and OR have access to only a small number failed instances $n_f$ for training, ORC has access to $n_f$ instances as well as partial labels from $n_c$ censored instances for training. Therefore, MR and OR models tend to overfit while ORC models are more robust.

TABLE 3A

| | | | FD001 | | | | | |
|---|---|---|---|---|---|---|---|---|
| | Instances | | RMSE | | | Timeliness Scores (S) | | |
| m(%) | $n_f$ | $n_c$ | MR | OR | ORC | MR | OR | ORC |
| 0 | 80 | 0 | 15.62 | 14.28 | 14.28 | 507.2 | 346.77 | 346.77 |
| 50 | 40 | 40 | 17.56 | 19.06 | 16.61 | 444.1 | 564.14 | 363.19 |
| 70 | 24 | 56 | 19.92 | 16.48 | 18.26 | 713.31 | 362.21 | 481.73 |
| 90 | 8 | 72 | 25.32 | 24.83 | 22.37 | $1.26 \times 10^4$ | $3.07 \times 10^4$ | $1.73 \times 10^3$ |

TABLE 3B

| | | | FD004 | | | | | |
|---|---|---|---|---|---|---|---|---|
| | Instances | | RMSE | | | Timeliness Scores (S) | | |
| m(%) | $n_f$ | $n_c$ | MR | OR | ORC | MR | OR | ORC |
| 0 | 199 | 0 | 26.88 | 28.07 | 28.07 | 4.92 | 5.55 | 5.55 |
| 50 | 100 | 99 | 29.71 | 32.85 | 31.7 | 7.97 | 17.9 | 9.97 |
| 70 | 60 | 139 | 33.17 | 33.65 | 32.3 | 18.8 | 17.4 | 11.2 |
| 90 | 20 | 179 | 41.23 | 43.88 | 38.17 | 102.0 | 111.0 | 39.0 |

The present disclosure and systems and methods associated thereof further provide a comparison with existing deep CNN based regression approach and LSTM-based RUL estimation considering MR approaches in below Table 4.

TABLE 4

| | FD001 | | FD004 | |
|---|---|---|---|---|
| Methods/Approaches | RMSE | S | RMSE | S |
| CNN-MR (existing method) | 18.45 | $1.29 \times 10^3$ | 29.16 | $7.89 \times 10^3$ |
| LSTM-MR (existing method) | 16.14 | $3.38 \times 10^2$ | 28.17 | $5.55 \times 10^3$ |
| MR | 15.62 | $5.07 \times 10^2$ | 26.88 | $4.92 \times 10^3$ |
| ORC (proposed) | 14.28 | $3.47 \times 10^2$ | 28.07 | $5.55 \times 10^3$ |

As can be seen from above Table 4, ORC (same as OR for m=0%) performs comparable to existing MR methods. More importantly, as noted above, ORC may be advantageous and more suitable for practical scenarios with few failed training instances.

In the present disclosure, systems and methods proposed an approach for RUL estimation using deep ordinal regression based on multilayered LSTM neural networks. It is evident from above experimental results and analysis that ordinal regression formulation is more robust compared to metric regression, as the former allows to incorporate more labeled data from censored instances. It was also found that leveraging censored instances significantly improves the performance when the number of failed instances is small.

As mentioned above, estimating Remaining Useful Life (RUL) from multi-sensor time series data is difficult through manual inspection. Current machine learning and data analytics methods, for RUL estimation require large number of failed instances for training, which are rarely available in practice. Such machine learning and data analytics methods cannot use information from currently operational instances since their failure time is unknown. Trajectory similarity based approaches compare the health index trajectory of an instance with the trajectories of failed train instances to obtain the remaining useful life. Such approaches work well when trajectories are smooth and monotonic in nature but are likely to fail in scenarios when there is noise or intermittent disturbances.

Embodiments of the present disclosure provide systems and methods for estimating Remaining Useful Life (RUL) using time series data by implementing an LSTM-RNN based ordinal regression technique, wherein during training RUL value of failed instance(s) is encoded into a vector which is given as a target to the model. Unlike a failed instance, the exact RUL for a censored instance is unknown. For using the censored instances, target vectors are generated and the objective function is modified for training wherein the trained LSTM-RNN based ordinal regression is applied on an input test time series for RUL estimation.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
obtaining a first time series data and a second time series data pertaining to one or more entities, wherein the first time series data comprises time series data for one or more failed instances specific to one or more parameters associated with the one or more entities, and wherein the second time series data comprises time series data for one or more censored instances specific to the one or more parameters associated with the one or more entities (202);
determining (i) a Remaining Useful Life (RUL) for the one or more failed instances and (ii) at least a minimum RUL for the one or more censored instances (204);
generating (i) a first set of binary labels using the RUL for the one or more failed instances and (ii) a second set of binary labels using the at least a minimum RUL for the one or more censored instances respectively (206), wherein generating the first set of binary labels using the RUL, r, for the one or more failed instances comprises:
splitting a range $[0, r_u]$ of RUL values into K intervals of length c each, where the length c is an interval length, where each interval is considered as a discrete variable and jth interval corresponds to $$\left((j-1)\frac{r_u}{c}, j\frac{r_u}{c}\right],$$

and r is mapped to the kth interval with $$k = \left\lceil \frac{r}{c} \right\rceil,$$

where $r_u$ is an upper bound on the RUL values;
considering K binary classification sub-problems for the K intervals;
solving a binary classification problem of determining whether $$r \le j\frac{r_u}{c};$$

and
computing a target vector, y, by using an expression: $y=[y_1, \ldots y_K] \in \{0,1\}^K$ from r such that:

$$y_j = \begin{cases} 0 & j < k \\ 1 & j \ge k \end{cases}$$

where j=1, 2, ..., K; and
training, a Recurrent Neural Network (RNN) based Ordinal Regression Model (ORM) comprising one or more binary classifiers, using (i) the first set of binary labels and (ii) the second set of binary labels and associated label information thereof, wherein during the training of RNN based ORM, the RUL of the one or more failed instances is encoded into the target vector and the at least a minimum RUL of the one or more censored instances is encoded into a partial target vector, wherein a set of target labels from a plurality of target labels in the partial target vector are masked, and wherein the RNN based ORM is used in an online manner for the one or more censored instances, when the RNN based ORM is trained (208).

2. The processor implemented method of claim 1, further comprising:

obtaining a time series data pertaining to one or more parameters of the one or more entities, wherein the time series data comprises one or more test instances (210);

applying the trained RNN based ORM comprising the one or more trained binary classifiers on the time series data comprising the one or more test instances to obtain an estimate of target label for each of the one or more trained binary classifiers, wherein an estimate of the target vector is obtained using the estimate of target label obtained for each of the one or more trained binary classifiers (212); and generating, by using the estimate of the target vector, a RUL estimate specific to the one or more test instances of the one or more entities (214).

3. The processor implemented method of claim 1, wherein the one or more parameters are obtained from one or more sensors.

4. A system (100), comprising:

a memory (102) storing instructions;

one or more communication interfaces (106); and one or more hardware processors (104) coupled to the memory (102) via the one or more communication interfaces (106), wherein the one or more hardware processors (104) are configured by the instructions to:

obtain a first time series data and a second time series data pertaining to one or more entities, wherein the first time series data comprises time series data for one or more failed instances specific to one or more parameters associated with the one or more entities, and wherein the second time series data comprises time series data for one or more censored instances specific to the one or more parameters associated with the one or more entities;

determine (i) a Remaining Useful Life (RUL) for the one or more failed instances and (ii) at least a minimum RUL for the one or more censored instances;

generate (i) a first set of binary labels using the RUL for the one or more failed instances and (ii) a second set of binary labels using the at least a minimum RUL for the one or more censored instances respectively, wherein generating the first set of binary labels using the RUL, r, for the one or more failed instances comprises:

splitting a range $[0, r_u]$ of RUL values into K intervals of length c each, where the length c is an interval length, where each interval is considered as a discrete variable and jth interval corresponds to $$\left( (j-1)\frac{r_u}{c}, j\frac{r_u}{c} \right],$$

and r is mapped to the kth interval with $$k = \left\lceil \frac{r}{c} \right\rceil,$$

where $r_u$ is an upper bound on the RUL values;
considering K binary classification sub-problems for the K intervals;
solving a binary classification problem of determining whether $$r \le j\frac{r_u}{c};$$

and computing a target vector, y, by using an expression: $y=[y_1, \ldots y_K] \in \{0,1\}^K$ from r such that:

$$y_j = \begin{cases} 0 & j < k \\ 1 & j \ge k \end{cases}$$

where j=1, 2, . . . , K; and train, a Recurrent Neural Network (RNN) based Ordinal Regression Model (ORM) comprising one or more binary classifiers, using (i) the first set of binary labels and (ii) the second set of binary labels and associated label information thereof, wherein during the training of RNN based ORM, the RUL of the one or more failed instances is encoded into the target vector and the at least a minimum RUL of the one or more censored instances is encoded into a partial target vector, wherein a set of target labels from a plurality of target labels in the partial target vector are masked, and wherein the RNN based ORM is used in an online manner for the one or more censored instances, when the RNN based ORM is trained.

5. The system of claim 4, wherein the one or more hardware processors are further configured to:

obtain a time series data pertaining to one or more parameters of the one or more entities, wherein the time series data comprises one or more test instances;

apply the trained RNN based ORM comprising the one or more trained binary classifiers on the time series data comprising the one or more test instances to obtain an estimate of target label for each of the one or more trained binary classifiers, wherein an estimate of the target vector is obtained using the estimate of target label obtained for each of the one or more trained binary classifiers; and generate, by using the estimate of the target vector, a RUL estimate specific to the one or more test instances of the one or more entities.

6. The system of claim 4, wherein the one or more parameters are obtained from one or more sensors.

7. One or more non-transitory machine readable information storage mediums comprising one or more instructions which when executed by one or more hardware processors cause estimating remaining useful life of entities using associated failed and censored instances thereof by:

obtaining a first time series data and a second time series data pertaining to one or more entities, wherein the first time series data comprises time series data for one or more failed instances specific to one or more parameters associated with the one or more entities, and wherein the second time series data comprises time series data for one or more censored instances specific to the one or more parameters associated with the one or more entities;

determining (i) a Remaining Useful Life (RUL) for the one or more failed instances and (ii) at least a minimum RUL for the one or more censored instances;

generating (i) a first set of binary labels using the RUL for the one or more failed instances and (ii) a second set of binary labels using the at least a minimum RUL for the one or more censored instances respectively, wherein generating the first set of binary labels using the RUL, r, for the one or more failed instances comprises:

splitting a range $[0, r_u]$ of RUL values into K intervals of length c each, where the length c is an interval length, where each interval is considered as a discrete variable and jth interval corresponds to $$\left((j-1)\frac{r_u}{c}, j\frac{r_u}{c}\right],$$

and r is mapped to the kth interval with $$k = \left\lceil \frac{r}{c} \right\rceil,$$

where $r_u$ is an upper bound on the RUL values;

considering K binary classification sub-problems for the K intervals;

solving a binary classification problem of determining whether $$r \leq j\frac{r_u}{c};$$

and computing a target vector, y, by using an expression: $y=[y_1, \ldots y_K] \in \{0,1\}^K$ from r such that:

$$y_j = \begin{cases} 0 & j < k \\ 1 & j \geq k \end{cases}$$

where j=1, 2, ..., K; and training, a Recurrent Neural Network (RNN) based Ordinal Regression Model (ORM) comprising one or more binary classifiers, using (i) the first set of binary labels and (ii) the second set of binary labels and associated label information thereof, wherein during the training of RNN based ORM, the RUL of the one or more failed instances is encoded into the target vector and the at least a minimum RUL of the one or more censored instances is encoded into a partial target vector, wherein a set of target labels from a plurality of target labels in the partial target vector are masked, and wherein the RNN based ORM is used in an online manner for the one or more censored instances, when the RNN based ORM is trained.

8. The one or more non-transitory machine readable information storage mediums of claim 7, wherein the instructions which when executed by the one or more hardware processors further cause:

obtaining a time series data pertaining to one or more parameters of the one or more entities, wherein the time series data comprises one or more test instances;

applying the trained RNN based ORM comprising the one or more trained binary classifiers on the time series data comprising the one or more test instances to obtain an estimate of target label for each of the one or more trained binary classifiers, wherein an estimate of the target vector is obtained using the estimate of target label obtained for each of the one or more trained binary classifiers; and generating, by using the estimate of the target vector, a RUL estimate specific to the one or more test instances of the one or more entities.

9. The one or more non-transitory machine readable information storage mediums of claim 7, wherein the one or more parameters are obtained from one or more sensors.

* * * * *